US005453450A

United States Patent [19]
Kinzer et al.

[11] Patent Number: 5,453,450
[45] Date of Patent: Sep. 26, 1995

[54] STABILIZED CURABLE ADHESIVES

[75] Inventors: Kevin E. Kinzer, Woodbury; Wayne S. Mahoney, St. Paul; Michael C. Palazzotto, Ramsey, all of Minn.

[73] Assignee: Minnesota Mining and Manufacturing Company, St. Paul, Minn.

[21] Appl. No.: 78,546

[22] Filed: Jun. 16, 1993

[51] Int. Cl.⁶ .............................. C08F 2/50; C09J 163/00; C08K 5/3432; C08K 5/16
[52] U.S. Cl. .................. 522/18; 522/28; 522/29; 522/74; 522/75; 522/76; 522/78; 522/79; 522/170
[58] Field of Search .................... 522/29, 18, 75, 522/170, 28, 74, 76, 78, 79

[56] References Cited

U.S. PATENT DOCUMENTS

| | | | |
|---|---|---|---|
| 4,503,211 | 3/1985 | Robins | 528/92 |
| 4,642,126 | 2/1987 | Zador et al. | 51/295 |
| 4,652,274 | 3/1987 | Boettcher et al. | 51/298 |
| 4,677,137 | 6/1987 | Bany et al. | 522/31 |
| 4,707,432 | 11/1987 | Gatechair et al. | 430/281 |
| 4,846,905 | 8/1989 | Tarbutton et al. | 525/65 |
| 4,909,954 | 3/1990 | Palazzotto | 558/422 |
| 4,985,340 | 1/1991 | Palazzotto et al. | 522/25 |
| 5,059,701 | 10/1991 | Keipert | 556/13 |
| 5,089,536 | 2/1992 | Palazzotto | 522/16 |
| 5,191,101 | 3/1993 | Palazzotto | 556/47 |
| 5,252,694 | 10/1993 | Willett et al. | 522/13 |

FOREIGN PATENT DOCUMENTS

| | | |
|---|---|---|
| 38551/85 | 8/1985 | Australia. |
| 1277070 | 11/1990 | Canada. |
| 0511405A1 | 11/1992 | European Pat. Off.. |

OTHER PUBLICATIONS

"Mechanisms of the Photodecomposition of Initiators", George F. Vesley, Journal of Radiation Curing, Jan. 1986.
"Encyclopedia of Polymer Scients & Tech." vol. 6 (1986) 322.
"Chem. & Tech. UV & EB Formulations for Coatings, Inks & Paints" vol. III, Photoinitiators for Free Radical & Cationic Polymerization, SITA Tech., London 1991.
ASTM Designations: D 638–91, Standard Test Method for Tensile Properties of Plastics.
ASTM Designation: D 1002–72 (Reapproved 1983), Standard Test Method for Strength Properties of Adhesives in Shear by Tension Loading (Metal-to-Metal).
ASTM Designation D 907–93, Standard Terminology of Adhesives.
"Preparation of Chemically Derivatized Platinum and Gold Electrode Surfaces. Synthesis, Characterization, and Surface Attachment of Trichlorosilylferrocene, (1,1'-Ferrocenediyl)dichlorosilane, and 1,1'-Bis(triethoxysilyl)ferrocene", Wrighton et al., Journal of the American Chemical Society, (1978) 100, 7264.
"Magnetic Sysceptibility Study of Various Ferricenium and Iron(III) Dicarbollide Compounds", Hendrickson et al., Inorganic Chemistry, (1971) 10, 1559.

*Primary Examiner*—Susan W. Berman
*Attorney, Agent, or Firm*—Gary L. Griswold; Walter N. Kirn; Carolyn V. Peters

[57] ABSTRACT

A stabilized heat curable adhesive prepared from a formulation comprised of (1) at least one free radically polymerizable monomer; (2) at least one epoxy function monomer; (3) at least one free radical polymerization photoinitiator; (4) a thermally-initiated cationic catalyst system comprising (a) at least one salt of an organometallic cation, (b) at least one stabilizing additive; (5) optionally, at least one alcohol-containing material; and (6) optionally, adjuvants.

4 Claims, No Drawings

STABILIZED CURABLE ADHESIVES

TECHNICAL FIELD

This invention relates to epoxy-acrylate compositions that are photopolymerizable to give stabilized heat-curable film adhesives and to adhesives thereby obtained, which are particularly suitable for use in bonding substrates such as metals, glass, ceramic, wood, plastics, paints, and the like.

BACKGROUND OF THE INVENTION

The automotive, aerospace, consumer appliance, and other industries require adhesives that have a combination of properties such as high durability, resistance to continuous exposure to high temperatures and good adhesion to a wide range of substrates. Epoxy resin adhesives have often been used in the form of liquid adhesives for these applications requiring structural and semi-structural bonding. Several difficulties occur when a liquid adhesive is used, such as evaporation of solvent, loss of adhesive from the required bonding area and uneven distribution of adhesive over the surfaces to be bonded. Use of adhesives in film form eliminates difficulties which may occur when a liquid adhesive is used.

One conventional method of producing film adhesives involves dissolving a solid resin composition in a volatile organic solvent, pouring the resulting solution onto a flat surface and then evaporating the solvent to leave a film of the resin composition. In another conventional method of making a film adhesive, a solid resin composition is heated to its softening point, extruded through a slit and then cooled to form a solid film. These conventional methods have associated disadvantages. Use of a volatile solvent usually gives rise to toxicity and/or flammability problems, while evaporation of the solvent has expensive energy requirements and solvent recovery equipment is needed if costly wastage is to be avoided. Heating, whether for evaporation of the solvent or to soften the solid composition prior to extrusion, often results in advancement (polymerization) of the resin, shortening the shelf life of the resulting film adhesive and leading to its premature cure.

SUMMARY OF THE INVENTION

In one aspect, this invention provides a stabilized curable adhesive prepared from a formulation comprising:

(1) at least one free radically polymerizable monomer, such as, acrylates and/or methacrylates;

(2) at least one epoxy functional monomer;

(3) at least one free radical polymerization photoinitiator;

(4) a thermally-initiated cationic catalyst system comprising:

(a) at least one salt of an organometallic cation, wherein the salt of the organometallic cation is selected from a class of substituted and unsubstituted aromatic compounds based on a benzene or cyclopentadienyl nucleus, the metal atom is a transition metal atom, and the anion is tetrafluoroborate, hydroxypentafluoroantimonate, trifluoromethanesulfonate, hexafluorophosphate, hexafluoroarsenate, or hexafluoroantimonate;

(b) at least one stabilizing additive;

(5) optionally, at least one alcohol-containing material; and (6) optionally, adjuvants.

In another aspect, this invention provides an adhesive article comprising at least one substrate having on at least one major surface thereof the stabilized curable adhesive as described above.

In another aspect, this invention provides a method for preparing a stabilized adhesive comprising the steps of:

(1) providing a carrier web;

(2) preparing a curable composition comprising:

(a) at least one free radically polymerizable monomer;

(b) at least one epoxy functional monomer;

(c) at least one free radical photoinitiator;

(d) a thermally-initiated cationic catalyst system comprising:

(i) at least one salt of an organometallic cation, wherein the salt of the organometallic cation is selected from a class of substituted and unsubstituted aromatic compounds based on a benzene or cyclopentadienyl nucleus, the metal atom is a transition metal atom, and the anion is tetrafluoroborate, hexafluorophosphate, hexafluoroarsenate, hydroxypentafluoroantimonate, trifluoromethanesulfonate, or hexafluoroantimonate; and (ii) at least one stabilizing additive; and (3) coating the curable composition onto the carrier web;

(4) polymerizing component (a) by exposing the curable composition to radiation to activate the free radical photoinitiator to provide a heat-curable film adhesive; and (5) exposing the heat-curable film adhesive to a temperature sufficient to cure component (b) to provide a fully cured adhesive.

In yet another aspect, this invention provides an adhesive article comprising:

(a) at least one substrate;

(b) a heat curable film adhesive prepared according to the process described above in steps 1 to 4.

Advantageously, the film adhesives utilize photoinitiated free-radical initiators and thermal-initiated cationic catalysts. The adhesive compositions of the present invention have longer shelf life in the heat-curable film adhesive state, that is, they retain the desired physical properties of a pressure sensitive or hot melt adhesive for a longer period of time than art known heat-curable adhesives.

A further advantage is the radiation curing of a photopolymerizable component of a film adhesive composition, followed by thermal curing of the epoxy component is one method of eliminating disadvantages associated with conventional adhesive compositions.

As used in this application:

"acrylate syrup" means a composition comprising a partially polymerized mixture of (meth)acrylates only or a partially polymerized mixture of (meth)acrylates and unpolymerized epoxy monomers;

"(meth)acrylate-containing" means materials that are essentially free of (meth)acrylic acid, but contain a (meth)acrylate monomer, a mixture of (meth)acrylate monomers, or a (meth)acrylate-epoxy mixture, further (meth)acrylate and (meth)acrylic include both acrylate and methacrylate and acrylic and methacrylic, respectively;

"B-stage" means an intermediate stage in a thermosetting resin reaction in which the material softens when heated, and swells, but does not dissolve in certain liquids; (From ASTM Standard D907-91b);

"bireactive monomer" means a monomer that contains at least two free radically polymerizable groups or two cationically polymerizable groups and does not contain both types of groups;

"bifunctional monomer" means a monomer that contains both at least one free radically polymerizable group and at least one cationically polymerizable group;

"cure" and "polymerize" are used interchangeably in this application to indicate a chemical reaction in which many relatively simple molecules combine to form a chain-like macromolecule;

"epoxy-acrylate curable composition" is used to indicate uncured compositions, comprising at least one free radically polymerizable monomer, at least one epoxy monomer, at least one free radically initiator, at least one thermally-initiated cationic catalyst system, and other adjuvants such as fillers, dyes, flame retardants, such that the uncured compositions can be cured to a "cured epoxy-acrylate adhesive";

"film adhesive" means a heat curable adhesive compositions of the present invention coated onto a carrier web, can also be referred to as a "transfer adhesive";

"group" or "monomer" or "anion" or "ligand" means chemical species that allows for substitution or that may be substituted by conventional substituents that do not interfere with the desired product, for example, substituents can be alkyl, alkoxy, aryl, phenyl, halo (F, CI, Br, I), cyano, nitro, etc.;

"Tg" means glass-rubber transition temperature; and

"thermoplastic" means a high polymer that softens when exposed to heat and solidifies when cooled to room temperature.

DESCRIPTION OF THE PREFERRED EMBODIMENTS

A stabilized heat-curable adhesive is provided comprising at least one free radically polymerizable monomer, such as, acrylates and/or methacrylates; at least one epoxy functional monomer; a free radical polymerization photoinitiator; a thermally-initiated cationic catalyst system comprising: at least one salt of an organometallic cation, wherein the salt of the organometallic cation is selected from a class of substituted and unsubstituted aromatic compounds based on a benzene or cyclopentadienyl nucleus, the metal atom is a transition metal atom, and the anion is tetrafluoroborate, hexafluorophosphate, hexafluoroarsenate, or hexafluoroantimonate; and at least one stabilizing additive. The adhesive composition may also comprise an alcohol-containing material and optional adjuvants.

Particularly useful acrylate and methacrylate materials can be monomers and/or oligomers such as (meth)acrylates, acrylic acid esters, and methacrylic acid esters. Such monomers include mono-, di-, or polyacrylates and methacrylates such as methyl acrylate, methyl methacrylate, ethyl acrylate, isopropyl methacrylate, isooctyl acrylate, acrylic acid, n-hexyl acrylate, n-butyl acrylate, n-butyl methacrylate, stearyl acrylate, allyl acrylate, isobornyl acrylate, isobornyl methacrylate, phenoxyethyl acrylate, phenoxyethyl methacrylate, tetrahydrofurfuryl acrylate, tetrahydrofurfuryl methacrylate, cyclohexyl acrylate, cyclohexyl methacrylate, benzyl acrylate, benzyl methacrylate, ethoxyethoxyethyl acrylate, ethoxyethoxyethyl methacrylate, glycerol diacrylate, glycerol triacrylate, tetraethyleneglycol diacrylate, 1,4-butanediol diacrylate, ethyleneglycol diacrylate, diethyleneglycol diacrylate, triethyleneglycol dimethacrylate, 1,6-hexanediol diacrylate, 1,3-propanediol diacrylate, 1,3-propanediol dimethacrylate, trimethyolpropane triacrylate, 1,2,4-butanetriol trimethylacrylate, 1,4-cyclohexanediol diacrylate, pentaerythritol triacrylate, pentaerythritol tetraacrylate, pentaerythritol tetramethacrylate, sorbitol hexacrylate, bis[1-(2-acryloxy)]-p-ethoxyphenyl dimethylmethane, bis[1-(3-acryloxy-2-hydroxy)]-p-propoxyphenyl-dimethylmethane, tris-hydroxyethyl isocyanurate trimethacrylate; the bis-acrylates and bis-methacrylates of polyethylene glycols of average molecular weight 200–500, copolymerizable mixtures of acrylated monomers such as those disclosed in U.S. Pat. No. 4,652,274, and acrylated oligomers such as those disclosed in U.S. Pat. No. 4,642,126.

Monofunctional acrylates may be used in combination with multifunctional acrylates, such as di- or poly- acrylates provided that the ratio of monoacrylate to multifunctional acrylates is in the range of 50:50 to 99.999:0.001, preferably 98:2 to 99.999:0.001.

Particularly useful in preparing high performance coating compositions are the (meth)acrylates or mixtures thereof that form polymers with Tg's in the −20° C. to 40° C. range. Of particular advantage are the (meth)acrylate monomers wherein the ester group is derived by esterification from an alcohol that contains a heteroatom in addition to the hydroxyl group of the alcohol, such heteroatom being a chemically stable linkage between two carbon atoms on either side of the linkage. Such heteroatom may include for example a divalent oxygen, a trivalent nitrogen, or a polyvalent sulfur, preferably the (meth)acrylate monomers derived from an alcohol contains a divalent oxygen. Examples of such monomers are phenoxyethyl acrylate, phenoxyethyl methacrylate, tetrahydrofurfuryl acrylate, tetrahydrofurfuryl methacrylate, ethoxyethoxyethyl acrylate, ethoxyethoxyethyl methacrylate, glycerol diacrylate, glycerol triacrylate, tetraethyleneglycol diacrylate, 1,4-butanediol diacrylate, ethyleneglycol diacrylate, and diethyleneglycol diacrylate.

The preferred (meth)acrylates are particularly compatible with epoxy monomers and upon curing exhibit a high performance, clear coat, higher impact strength, greater tensile strength with essentially no phase separation.

Epoxy functional monomers useful in practicing this invention are those known to undergo cationic polymerization and include 1,2-, 1,3-, and 1,4-cyclic ethers (also designated as 1,2-, 1,3-, and 1,4-epoxides).

See the "Encyclopedia of Polymer Science and Technology", 6, (1986), 322, for a description of suitable epoxy functional resins. In particular, cyclic ethers that are useful include the cycloaliphatic epoxies such as cyclohexene oxide and the ERL™ series type of resins available from Union Carbide, such as vinylcyclohexene oxide, vinylcyclohexene dioxide, 3,4-epoxycyclohexylmethyl-3,4-epoxycyclohexanecarboxylate, bis-(3,4-epoxycyclohexyl) adipate and 2-(3,4-epoxycyclohexyl 5,5-spiro-3,4-epoxy) cyclohexene-m-dioxane; also included are the glycidyl ether type epoxy resins such as propylene oxide, epichlorohydrin, styrene oxide, glycidol, the Epon™ series type of epoxy resins available from Shell Chemical Co., including the diglycidyl ether of bisphenol A and chain extended versions of this material such as Epon 828, Epon 1001, Epon 1004, Epon 1007, Epon 1009 and Epon 2002 or their equivalent from other manufacturers, dicyclopentadiene dioxide, epoxidized polybutadienes like the Poly bd™ resins from Elf Atochem, 1,4-butanediol diglycidyl ether, polyglycidyl ether of phenolformaldehyde resole or novolac resin and resorcinol diglycidyl ether.

The preferred epoxy resins include the ERL™ type of resins, in particular 3,4-epoxycyclohexylmethyl-3,4-epoxycyclohexanecarboxylate, bis-(3,4-epoxycyclohexyl) adipate and 2-(3,4-epoxycylclohexyl-5,5-spiro-3,4-epoxy) cyclohexene-m-dioxane and the bisphenol A Epon™ type resins including 2,2-bis-[p-(2,3-epoxypropoxy)phenylpropane and chain extended versions of this material. It is also within the scope of this invention to use a blend of more than one epoxy functional resin.

When present, useful alcohol-containing materials include mono- or poly-alcohols as tougheners to the epoxy curable composition. The alcohol or polyol aids in chain extensions and preventing over-crosslinking of the epoxy monomer during curing. Such mono-alcohols can include methanol, ethanol, 1-propanol, 2-propanol, 2-methyl-2-propanol, 1-butanol, 2-butanol, 1-pentanol, neopentyl alcohol, 3-pentanol, 1-hexanol, 1-heptanol, 1-octanol, 2-phenoxyethanol, cyclopentanol, cyclohexanol, cyclohexylmethanol, 3-cyclohexyl-1-propanol, 2-norbornanemethanol, and tetrahydrofurfuryl alcohol.

The polyols useful in the present invention include aliphatic, cycloaliphatic, or alkanol-substituted arene polyols, or mixtures thereof having 2 to 18 carbon atoms and two to five, preferably two to four hydroxy groups. Nonlimiting examples of useful polyols include 1,2-ethanediol, 1,2-propanediol, 1,3-propanediol, 1,4-butanediol, 1,3obutanediol, 2-methyl- 1,3-propanediol, 2,2-dimethyl- 1,3-propanediol, and 2-ethyl-1,6-hexanediol, 1,5-pentanediol, 1,6-hexanediol, 1,8-octanediol, neopentyl glycol, glycerol, trimethylolpropane, 1,2,6-hexanetriol, trimethylolethane, pentaerythritol, quinitol, mannitol, diethylene glycol, triethylene glycol, tetraethylene glycol, glycerine, 2 -ethyl-2-(hydroxymethyl)- 1,3-propanediol, 2-ethyl-2-methyl- 1,3-propanediol, pentaerythritol, 2-ethyl-1,3-pentanediol, and 2,2-oxydiethanol, sorbitol, 1,4-cyclohexane dimethanol, 1,4-benzene dimethanol, 2-butene-1,4-diol, and polyalkoxylated bisphenol A derivatives. Particularly useful diols are 1,4-cyclohexanedimethanol and 1,6-hexanediol. Other examples of useful diols are disclosed in U.S. Pat. No. 4,503,211.

Higher molecular weight polyols include the polyethylene and polypropylene oxide polymers in the molecular weight range of 200 to 20,000 such as the Carbowax™ polyethyleneoxide materials supplied by Union Carbide, caprolactone polyols in the molecular weight range of 200 to 5,000, such as the Tone polyol materials supplied by Union Carbide, polytetramethylene ether glycol in the molecular weight range of 200 to 4,000, such as the Terathane™ materials supplied by Dupont, hydroxyl terminated polybutadiene resins such as the Poly bd™ materials supplied by Elf Atochem, or equivalent materials supplied by other manufacturers.

The alcohol functional component can be present as a mixture of materials and can contain mono- and polyhydroxyl containing materials. The alcohol-containing material, when present is present in an amount sufficient to provide an epoxy to hydroxy ratio in the composition between about 1:0.1 and 1:1, more preferably between about 1:0.2 and 1:0.8, and most preferably between about 1:0.3 and 1:0.6.

Adjuvants may optionally be added to the compositions such as colorants, stabilizers, light stabilizers, antioxidants, flow agents, bodying agents, flatting agents, inert fillers, binders, blowing agents, fungicides, bactericides, surfactants, plasticizers, rubber tougheners and other additives known to those skilled in the art. They can be also substantially unreactive, such as fillers both inorganic and organic. These adjuvants, if present are added in an amount effective for their art known purpose.

The free-radical initiator can be selected from those compounds that generate free-radicals upon exposure to radiation, for example, those compounds described in "Mechanisms of the Photodecomposition of Initiators" George F. Vesley, *Journal of Radiation Curing,* January, 1986, or in Chemistry & Technology of UV & EB Formulations for Coatings, Inks & Paints, Volume III, Photoinitiators for Free Radical and Cationic Polymerization, SITA Technology, London, 1991. Preferably, the free radical initiator is an α-substituted acetophenone or a mixture thereof with a thioxanthone or a benzophenone. In particularly preferred embodiments, the initiator is a benzil dialkyl ketal.

For partially polymerizing alkyl acrylate monomers without crosslinking, and to prepare acrylate-containing syrups, the following photoinitiators, either alone or in combination with each other, are found useful and include: the benzoin ethers (such as benzoin methyl ether or benzoin isopropyl ether), substituted benzoin ethers (such as anisoin methyl ether), substituted acetophenones (such as 2,2-diethoxyacetophenone and 2,2-dimethoxy-2-phenylacetophenone), substituted alpha-ketols (such as 2-methyl-2-hydroxypropiophenone), aromatic sulfonyl chlorides (such as 2-naphthalene-sulfonyl chloride) and photoactive oximes [such as 1 -phenyl- 1,1-propanedione-2(o-ethoxycarbonyl)oxime].

In preparing a free-radically polymerizable syrup (described below), the initiators may be used in amounts that range from 0.001 to 5.0 % by weight of the free radically polymerizable monomer, preferably 0.01 to 1.0% by weight. When used in the adhesive curable composition, the free radical initiators may be used in amounts that range from 0.01 to 5.0% by weight of the free radically polymerizable monomer, preferably 0.1 to 2% by weight.

Suitable organometallic salts are known in the art and can be prepared as described in, for example, U.S. Pat. Nos. 5,089,536, 5,059,701, and 5,191,101, and such description is incorporated herein by reference. Disubstituted ferrocene derivatives can be prepared by the general procedure described in *J. Amer. Chem. Soc.,* 1978, 100, 7264. Ferrocene derivatives can be oxidized to prepare the corresponding ferrocenium salts by the procedure described in *Inorg. Chem,* 1971, 10, 1559. Salts of organometallic complex cations can be used as mixtures and isomeric mixtures.

Preferred salts of organometallic complex cations useful in the compositions of the present invention are derived from a class of substituted and unsubstituted aromatic compounds based on a benzene or cyclopentadienyl nucleus, the metal atom is iron, and the anion is tetrafluoroborate, hexafluorophosphate, hexafluoroarsenate, hydroxypentafluoroantimonate, trifluoromethanesulfonate, or hexafluoroantimonate.

The salts of organometallic complex cations useful in the adhesive compositions of the present invention have the formula:

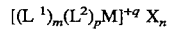

wherein:

M is selected from the group containing Cr, Mo, W, Mn, Re, Fe, Ru, and Os;

$L^1$ represents ligands contributing π-electrons that can be selected from substituted and unsubstituted aromatic compounds and substituted and unsubstituted heterocyclic aromatic compounds, and capable of contributing six π-electrons to the valence shell of M;

$L^2$ represents ligands contributing π-electrons that can be selected from substituted and unsubstituted cyclopentadienyl and indenyl anions, and capable of contributing six π-electrons to the valence shell of M;

m and p are integers having a value of 0 or 2, such that, when m is equal to 2, each $L^1$ may be the same or different ligands and p is equal to 0; and when p is equal to 2, each $L^2$ may be the same or different ligands and m is equal to 0, provided the sum of (m+p) is equal to 2.

q is an integer having a value of 1 or 2, the residual charge of the complex cation;

X is an anion selected from organic sulfonate anions selected from the group consisting of $CH_3SO_3^-$, $CF_3SO_3^-$, $C_6H_5SO_3^-$, p-toluenesulfonate, p-chlorobenzenesulfonate and related isomers, and halogen-containing complex anions of a metal or metalloid selected from the group consisting of $BF_4^-$, $AsF_6^-$, $PF_6^-$, $SbF_5OH^-$, $SbF_6^-$, and $CF_3SO_3^-$; and n is an integer having a value of 1 or 2, the number of complex anions required to neutralize the charge q on the complex cation.

The preferred salts of organometallic complex cations useful in the compositions of the invention are where $L^1$ is selected from the class of substituted and unsubstituted aromatic compounds based on benzene and $L^2$ is selected from the class of substituted and unsubstituted compounds containing a cyclopentadienyl anion, M is Fe and X is selected from the group consisting of tetrafluoroborate, hexafluorophosphate, hexafluoroarsenate, hexafluoroantimonate, hydroxypentafluoroantimonate or trifluoromethanesulfonate.

Examples of the preferred salts of organometallic complex cations useful in preparing the compositions of the invention include the following:

bis-($\eta^6$-benzene)iron(2+) hexafluoroantimonate
bis-($\eta^6$-cumene)iron(2+) hexafluoroantimonate
bis-($\eta^6$-durene)iron(2+) hexafluoroantimonate
bis-($\eta^6$-p-xylene)iron(2+) hexafluoroantimonate
bis-($\eta^6$-mesitylene)iron(2+) hydroxypentafluoroantimonate
bis-($\eta^6$-mesitylene)iron(2+) trifluoromethanesulfonate
bis-($\eta^6$-mesitylene)iron(2+) hexafluoroantimonate
bis-($\eta^6$-hexamethylbenzene)iron(2+) hexafluoroantimonate
bis-($\eta^6$-pentamethylbenzene)iron(2+) hexafluoroantimonate
bis-($\eta^5$-methylcyclopentadienyl)iron(1+) hexafluoroantimonate
bis-($\eta^5$-trimethylsilylcyclopentadienyl)iron(1+) hexafluoroantimonate
bis-($\eta^5$-triphenyltincyclopentadienyl)iron(1+) hexafluoroantimonate
bis-($\eta^5$-indenyl)iron(1+) hexafluoroantimonate
($\eta^5$-cyclopentadienyl)($\eta^5$-methylcyclopentadienyl)iron(1+) hexafluoroantimonate
bis-($\eta^5$-cyclopentadienyl)iron(1+) trifluoromethanesulfonate
bis-($\eta^5$-trimethylsilylcyclopentadienyl)iron(1+) trifluoromethanesulfonate
bis-($\eta^5$-triphenyltincyclopentadienyl)iron(1+) trifluoromethanesulfonate
bis-($\eta^5$-cyclopentadienyl)iron(1+) hexafluoroantimonate
bis-($\eta^5$-cyclopentadienyl)iron(1+) hydroxypentafluoroantimonate Useful stabilizing additives include several class of compounds that have segments or central nucleus as described in formulas 1 to 4. For example, the first class are Schiff bases and can be described by formula 1:

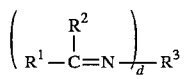

(1)

wherein
$R^1$ is a radical moiety that can be the same or different and is selected from substituted and unsubstituted $C_1$ to $C_{10}$ alkyl groups, substituted and unsubstituted groups of one to four aromatic rings, wherein two to four rings can be fused or unfused rings;

$R^2$ is hydrogen or $R^1$; when $R^2$ is $R^1$, $R^1$ and $R^2$ can be taken together to form a cyclic ring having 5 to 7 ring atoms;

$R^3$ is R 1 or divalent group (as when d=2) selected from alkylene, having 2 to 10 carbon atoms and phenylene groups; and d is 1 or 2.

These stabilizers are compounds known as Schiff bases and are generally made by the condensation of a ketone or aldehyde with a primary amine. They can be prepared by the general methods described in U.S. Pat. No. 4,909,954. In preferred compounds, d is 2, $R^1$ is a substituted or unsubstituted phenyl group and $R^2$ is hydrogen, and $R^3$ is a divalent bridging group such as an alkylene or phenylene group.

A second class of stabilizing additives are those having the following formula:

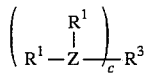

(2)

wherein
Z is nitrogen, phosphorus, arsenic or antimony;

c is 1 or 2; and $R^1$ and $R^3$ are as defined above.

Examples of this class of stabilizer include, trialkyl, tricycloalkyl, tri(alkylcycloalkyl), triaryl, and trialkaryl amines, phosphines, phosphine oxides, arsines, and stibines. Useful tertiary amines are described in U.S. Pat. No. 4,503,211 and such description is incorporated herein by reference. The preferred stabilizers of this class include triarylphosphines, triarylstibines, and substituted and unsubstituted dialkylaryl tertiary amines.

A third class of useful stabilizing additives are those having formulas 3 and 4:

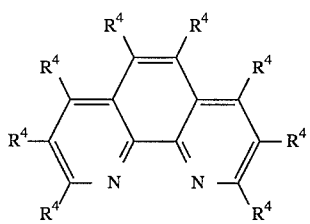

(3)

wherein $R^4$ is hydrogen or $R^3$, and each $R^4$ may be independently selected and is as defined above; furthermore $R^4$ groups may be taken together to form one or more cyclic rings, each ring having 5 to 7 ring atoms. Examples of this stabilizer includes substituted and unsubstituted phenanthroline compounds, the most common substituents being alkyl groups having 1 to 20 carbon atoms, the preferred phenanthroline being 1,10-phenanthroline; and

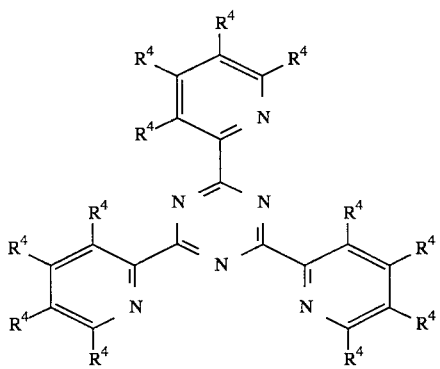
(4)

wherein $R^4$ may be independently selected and is as defined above. Examples of this stabilizing additive include substituted and unsubstituted tripyridyltriazine compounds, the preferred tripyridyltriazine being 2,4, 6-tripyridyltriazine.

Examples of useful substituting groups for $R^1$, $R^2$, $R^3$ or $R^4$ all of which preferably have less than 30 carbon atoms and up to 10 heteroatoms, are selected from the group consisting of hydrocarbyl, hydrocarbyloxy, hydrocarbyloxycarbonyl, hydrocarbylcarbonyl, hydrocarbylcarbonyloxy, cyclohexanecarbonyloxy, hydrocarbylcarbonamido, halo, dimethylamino, diphenylphosphino, diphenylarsino, diphenylstibine, trimethylgermane, tributyltin, methylseleno, ethyltelluro, trimethylsiloxy groups, and aromatic rings, such as cyclopentadienyl, phenyl, naphthyl, and indenyl.

A suitable mixture that includes salts of organometallic complex cations and the free radical photoinitiator are those combinations that upon application of sufficient energy, such as thermal, accelerated particle (electron beam), or electromagnetic radiation having a wavelength from about 200 to 700 nanometers, will generate an active species capable of catalyzing the polymerization of the compositions of the invention.

Any convenient source of energy providing radiation in the region of the spectrum that overlaps the absorption bands of the photoinitiators can be used to activate free radical formation. The radiation can be monochromic or polychromic, incoherent or coherent, and for high efficiency should correspond closely in wavelength to the principal absorption bands of the initiators and should be sufficiently intense to activate a substantial portion of the free radically polymerizable mixture (for syrup preparation) or the curable adhesive composition (final curable composition.

The initiator system is present in a catalytically effective amount to initiate curing of the epoxy monomer components of the adhesive compositions. Typically, the initiator system (at least one salt of an organometallic cation and at least one stabilizing additive) can be present in the range of 0.01 to 20% by weight, preferably 0.1 to 5% by weight of the total polymerizable composition. The mole ratio of the salt of the organometallic cation to the stabilizing additive is generally in the range of 1:10 to 10:1, preferably 1:5 to 5:1, when the additive is a class 1, 2 or 4 type compound. When the additive is a class 3 compound, the mole ratio of the salt of the organometallic cation to the stabilizing additive is generally in the range of 1:5 to 1:30, preferably 1:6 to 1:25.

The level of catalytic activity will, of course, depend on the choice of metal, ligands, counterions in the organometallic salt, and the amount the organometallic salt. Furthermore, the level of catalytic activity will also be affected by the choice and amount of the stabilizing additive.

Temperature of polymerization and amount of initiator system used will also depend on the particular polymerizable composition used and the desired application of the polymerized product.

When preparing the curable compositions, solvents, preferably organic, can be used to assist in dissolution of the cationic initiator system and as a processing aid. It may be advantageous to prepare a concentrated solution of the organometallic complex salt in a small amount solvent to simplify the preparation of the polymerizable composition. Useful solvents are lactones, such as y-butyrolactone, γ-valerolactone; ketones such as acetone, methyl ethyl ketone, methyl isobutyl ketone, cyclopentanone and cyclohexanone; sulfones, such as tetramethylene sulfone, 3-methylsulfolane, 2,4-dimethylsulfolane, butadiene sulfone, methyl sulfone, ethyl sulfone, propyl sulfone, butyl sulfone, methyl vinyl sulfone, 2-(methylsulfonyl)ethanol, 2,2'-sulfonyldiethanol, sulfoxides, such as dimethyl sulfoxide; cyclic carbonates such as propylene carbonate, ethylene carbonate and vinylene carbonate; carboxylic acid esters such as ethyl acetate, methyl cellosolve acetate, methyl formate, and other solvents such as methylene chloride, nitromethane, acetonitrile, glycol sulfite and 1,2-dimethoxyethane (glyme). In some applications, it may be advantageous to adsorb the initiator onto an inert support such as silica, alumina, clays, as described in U.S. Pat. No. 4,677,137, incorporated herein by reference.

The curable adhesive composition can be prepared using a free-radically polymerizable syrup (also referred to as "syrup"), that is partially polymerized free radical monomers (0.001% to 15.0% conversion), or a mixture of partially polymerized free radical monomers and substantially unpolymerized epoxy monomers, and optional adjuvants.

METHOD 1

A first step in the preparation of a syrup is to mix free radically polymerizable monomers with a catalytically effective amount of a free radical initiator. Preferably, the free radical photoinitiator is not a crosslinking agent and is generally present in an amount within the range of 0.001 to 5.0% by weight of the polymerizable composition, preferably in the range of 0.01 to 1.0% by weight of the polymerizable composition.

A second step is to apply energy to the free-radically polymerizable composition to allow it to polymerize such that the viscosity is increased to within a range of 300 to 20,000 cps (0.3 to 20.0 Pascal seconds) at ambient temperature. Preferably, the viscosity after this step is in the range of 500 to 4000 cps (0.5 to 4.0 Pa.sec). The increased viscosity provides a syrup that is more suitable as a coating composition for production of the articles of the invention. The polymerizable composition may be polymerized using any well-known free-radically polymerization technique and quenched with air to attain the desired viscosity. Preferably, the free radical initiator is a photoinitiator, and the partial polymerization may be stopped at any point by eliminating the irradiation source.

A third step is to mix the cationically polymerizable monomers and optional alcohol-containing material into the syrup.

A fourth step is to mix at least one organometallic complex salt, and a stabilizing additive optionally, into an amount of solvent sufficient to dissolve the salt and additive. This solution is then added to the syrup of step three. Optional bireactive free radically polymerizable monomer, bifunctional monomer, adjuvants and additional amount of the above-identified free radical initiator may be added to the syrup at this time.

A fifth step is to degas the curable compositions under vacuum to remove bubbles, dissolved air, oxygen, and the like. Although it is preferable to do this step just prior to coating, it may be carried out at any time from a few hours to several weeks prior to coating. To insure stability of the degassed curable compositions, it is preferable to keep them from unwanted exposure to light.

METHOD 2

A first step in this alternative preparation for a syrup is to mix the polymerizable monomers (cationically and free radically polymerizable monomers) with a catalytically effective amount of a free radical initiator. Preferably, the free radical initiator is not a crosslinking agent and is generally present in an amount within the range of 0.001 to 5.0% by weight of the polymerizable composition, preferably in the range of 0.01 to 1.0% by weight of the polymerizable composition.

A second step is to apply energy to the polymerizable composition to allow the free radically polymerizable monomers to polymerize such that the viscosity is increased to within a range of 0.3 to 20.0 Pascal seconds (Pa·sec) at ambient temperature. Preferably, the viscosity after this step is in the range of 0.5 to 2.0 Pa·sec. The increased viscosity provides a syrup that is more suitable as a coating composition for production of the articles of the invention. The polymerizable composition may be polymerized using any well-known free-radically polymerization technique and quenched with air to attain the desired viscosity.

A third step is to mix at least one organometallic complex salt, the stabilizing additives and any optional bireactive free radically polymerizable monomer, bifunctional monomer, adjuvants and additional amount of the above-identified free radical initiator into the syrup of step two.

A fourth step is to degas the curable compositions under vacuum to remove bubbles, dissolved air, oxygen, and the like. Although it is preferable to do this step just prior to coating, it may be carried out at any time from a few hours to several weeks prior to coating. To insure stability of the degassed curable compositions, it is preferable to keep them from unwanted exposure to light.

Generally, the polymerizable composition can be polymerized by any well-known free-radical polymerization techniques and quenched with air to attain the desired viscosity. It is preferable to use a photoinitiator as the free radical initiator in this process, such that the partial polymerization may be stopped at any point by eliminating the irradiation source and then quenching polymerization with oxygen. Furthermore, it is preferable to use a low intensity irradiation source in this photochemical process and that the mixture be cooled during irradiation. Low intensity irradiation and cooling minimize gel formation during the syrup making process. By "cooling" is meant to keep the composition at or below room temperature.

Once the curable adhesive compositions have been prepared either using Method 1 or Method 2, the compositions can be coated onto a carrier web and photocured to produce the heat-curable adhesive of the present invention, having an enhanced shelf life retaining the pressure sensitive or hot melt adhesive properties for a time period longer than similar art known epoxy-acrylate heat-curable adhesives.

The curable adhesive compositions can be coated onto the carrier web using any art known coating techniques, such as knife or roll coating. The compositions are coated to a dry thickness that range between 0.025 to 2.5 mm.

An adhesive article is provided by coating a carrier web with a curable adhesive composition according to either Method 1 or 2 above. Once the composition has been coated, the curable composition is irradiated in the range of 200 to 700 nanometers with sufficient energy to cure the free-radically polymerizable component and produce a heat-curable adhesive. Advantageously, the heat curable adhesive can retain the characteristics of a pressure sensitive or hot melt adhesive until final application. For final application, the adhesive article comprising a carrier web coated with the heat curable adhesive can be applied to an appropriate substrate wherein the heat curable adhesive is then heat cured to produce a fully cured adhesive, that is to fully cure the epoxy portion of the adhesive. The carrier web may be removed either before or after heat curing. The fully cured adhesive provides high durability, resistance to exposure to high temperatures and good adhesion to a wide range of substrates.

Suitable sources of heat to cure the compositions of the invention include induction heating coils, ovens, hot plates, heat guns, IR sources including lasers, microwave sources, etc.

Suitable carrier webs and substrates useful to provide articles of the invention include, for example, metals (for example, aluminum, iron, steel, copper, cadmium, zinc, nickel, silver), glass, paper, wood, various thermoplastic or thermoset films (for example, polyethylene terephthalate, plasticized polyvinyl chloride, polypropylene, polyethylene), cloth, ceramics and cellulosics, such as cellulose acetate. Particularly useful carrier webs have surface properties that allow the webs to function as release liners, such conditions and properties being well known to those skilled in the art.

Objects and advantages of this invention are further illustrated by the following examples, but the particular materials and amounts thereof recited in these examples, as well as other conditions and details, should not be construed to unduly limit this invention. All materials are commercially available or known to those skilled in the art unless otherwise stated or apparent.

| | Glossary |
|---|---|
| nBA | n-butyl acrylate |
| IBA | isobornyl acrylate (available from Sartomer Co. under the trade designation "SR-506") |
| THFA | tetrahydrofurfuryl acrylate |
| POEA | phenoxyethyl acrylate |
| Epon 828 | diglycidyl ether of bisphenol A (epoxy equivalent weight of 185–192 g · eq$^{-1}$) (Available from Shell Chemical Co. under the trade designation "EPON 828") |
| Epon 1001F | diglycidyl ether of bisphenol A (epoxy equivalent weight of 525–550 g · eq$^{-1}$) (available from Shell Chemical Co. under the trade designation "Epon 1001F") |
| KB-1 | 2,2-dimethoxy-2-phenylacetophenone (available from Sartomer Co. under the trade designation "KB-1") |
| CHDM | 1,4-cyclohexanedimethanol |
| HDO | 1,6-hexanediol |
| Schiff base | 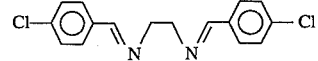 |

-continued

Glossary

| | |
|---|---|
| Me | methyl |
| Cp$_2$FeSbF$_6$ | bis($\eta^5$-cyclopentanedienyl)iron(1+) hexafluoroantimonate |
| Mes$_2$Fe(SbF$_6$)$_2$ | bis($\eta^6$-mesitylene)iron(2+) hexafluoroantimonate |

TEST METHODS

Differential Scanning Calorimetry (DSC)

DSC was used to measure the exothermic heat of reaction associated with the cure of the epoxy material. This energy is measured in Joule/gram (J/g). The exotherm profile, i.e. peak temperature, onset temperature, etc., of the exotherm provided information on conditions that are needed to cure the material. The onset temperature (T$_{onset}$) is the point of intersection between the tangents drawn to the curve along the baseline, and after the onset of the exotherm at the point of maximum change in slope. The integrated energy under an exothermic peak is related to the extent of cure. For a stable composition, more of that exotherm energy should remain with time indicating that the composition is not curing prematurely. For an unstable composition, the exotherm energy will decrease more rapidly with time indicating that the composition has undergone some degree of cure prematurely.

Tensile Strength

Tensile tests were conducted following the method described in ASTM 628-87 Tensile Testing Methods standard. Tensile test samples were prepared by curing the adhesive between the silicone coated liners at the temperatures and time specified and then cutting specimens using an ASTM 628-87 Type IV die. The samples were tested at a strain rate of 5 cm/min. An Instron Model 1122 tensile tester was used for the tests. Ultimate tensile strength is reported in MPa and is the strength at break, percent elongation is reported in % using the crosshead movement as a measure of elongation, energy at break is reported in Newton-meters (N-m) and is the area under the stress-strain curve.

Overlap Shear Strength

Samples were prepared by cutting 12.7 mmx 25.4 mm specimens from the adhesive film. The silicone release liner was removed from one side of the specimen and the exposed adhesive was applied to one end of a 25.4 mmx 50.8 mm test coupon (either 0.9 mm thick electrocoated steel or 1.7 mm aluminum). The silicone release liner was removed from the other side of the specimen and another coupon was placed over the adhesive such that there was a 12.7 mm overlap of the coupons and with the uncoated ends of the coupons aligned in opposite directions from each other. The coupons were clamped together and thermally cured. The prepared samples were cooled for at least 1 hour at about 22° C. before testing. The lap shear was determined using an Instron Model 1122 tensile tester according to ASTM Test Method D1002-72 with a crosshead speed of 5 cm/min. The lap shear strength was reported in megaPascals (MPa).

EXAMPLES

Preparation of the Adhesive Compositions

All the compositions were prepared according to the following procedure: The compositions for Examples 1, 2 and 4 and Comparative Examples C1 and C2 were prepared according to the following procedure:

(1) The acrylate monomers were combined in a glass jar with 0.2 wt. % KB-1 and sparged with N$_2$ for approximately 10 to 15 minutes at which time the mixture was irradiated with super diazo blue fluorescent lamps for a time sufficient to provide an acrylate syrup with a viscosity of approximately 1 Pa .sec. Air was then bubbled into the syrup to quench the polymerization reaction.

(2) The epoxy resins and alcohols were mixed with the acrylate syrup.

(3a) The organometallic complex salt and stabilizer, where included, were dissolved in solvent. The solution was than added to the acrylate syrup, epoxy, and alcohol mixture along with the KB-1 free radical photoinitiator. The components and relative amounts are summarized in Table 1.

(3b) For Example 2 and Comparative Example C2, the organometallic complex salt and stabilizer, where included, were added directly to the mixture prepared as described in step (2) above.

(4) The compositions were degassed under vacuum and then knife coated to a thickness of approximately 750 micrometers between two silicone-coated polyester release liners and then photocured by irradiating from both sides with Sylvania 350 BL bulbs for approximately 3 minutes to provide a heat-curable film adhesive.

The compositions for Example 3 and Comparative Example C3 were prepared according to the following procedure:

(1) The acrylate monomers, epoxy resins and alcohols were combined in a glass jar with 0.01 wt. % KB-1 and sparged with N$_2$ for approximately 10 to 15 minutes at which time the mixture was irradiated with Sylvania 350 BL fluorescent lamps for a time sufficient to provide a syrup with a viscosity of approximately 1 Pao sec. Air was then bubbled into the syrup to quench the polymerization reaction.

(2) The organometallic complex salt and stabilizer, where included, were dissolved in solvent. The solution was then added to the syrup along with KB-1 photoinitiator.

(3) The compositions were degassed under vacuum and then knife coated to a thickness of approximately 750 micrometers between two silicone-coated polyester release liners and then photocured by irradiating from both sides with Sylvania 350 BL bulbs for approximately 3 minutes to provide a heat-curable film adhesive.

The DSC, Overlap Shear and Tensile Strength results for Examples 1–4 are summarized in Tables 2–5, respectively.

Comparative Example C1 had no tack after 5 days at room temperature. DSC analysis indicated the epoxy had cured within 8 days at room temperature.

Comparative Example C2 had no tack after 1 day at room temperature. DSC analysis indicated the epoxy had cured within 7 days at room temperature.

Comparative Example C3 had no tack after 1 day at room temperature. DSC analysis indicated the epoxy had cured overnight at room temperature.

TABLE 1

| Components | 1 | C1 | 2 | C2 | 3 | C3 | 4 |
|---|---|---|---|---|---|---|---|
| nBA | 36 | 36 | 36 | 36 | — | — | 30 |
| IBA | — | — | — | — | 30 | 30 | — |
| THFA | 24 | 24 | 24 | 24 | — | — | 30 |
| POEA | — | — | — | — | 30 | 30 | — |
| Epon 828 | 32 | 32 | 32 | 32 | 20 | 20 | — |
| Epon 1001F | 8 | 8 | 8 | 8 | 20 | 20 | 40 |
| KB-1 | 0.6 | 0.6 | 0.6 | 0.6 | 0.4 | 0.4 | 0.6 |
| CHDM | 2 | 2 | 2 | 2 | 0.9 | 0.9 | 2 |
| HDO | 2 | 2 | 2 | 2 | 0.9 | 0.9 | 2 |
| $Cp_2FeSbF_6$ | — | — | 0.4 | 0.4 | — | — | — |
| $Mes_2Fe(SbF_6)_2$ | 0.4 | 0.4 | — | — | 0.4 | 0.4 | 0.4 |
| Phenanthroline | 0.094 | — | — | — | 0.098 | — | 0.094 |
| Schiff Base | — | — | 0.05 | — | — | — | — |
| 3-MeSulfolane | 1 | 1 | — | — | — | — | 1 |
| γ-butyrolactone | — | — | — | — | 1.1 | 1.1 | — |

TABLE 2a

DSC Analysis for Example 1

| Days at R.T. | $T_{onset}$ (°C.) | $T_{peak}$ (°C.) | Exotherm (J/g) |
|---|---|---|---|
| 8 (tacky) | 112.1 | 134.0 | 132.9 |
| 22 (tacky) | 110.8 | 132.2/179.8 | 126.8 |
| 36 (tacky) | 94.6 | 140.9/182.3 | 116.1 |
| 43 (tacky) | 95.6 | 140.9/182.3 | 126.4 |
| 54 (tacky) | 98.6 | 140.3/181.6 | 133.2 |
| 78 (tacky) | 92.7 | 182.1 | 144.8 |
| 96 (tacky) | ~90 | ~130/183.5 | 105.3 |
| 105 (low tack) | 92.3 | 126.5/180.4 | 72.9 |
| 119 (no tack) | 96.5 | 122.1/184.2 | 47.4 |

TABLE 2b

Tensile and Overlap Shear Strength for Example 1

Tensile Strength

| Cure Conditions | Break Stress (MPa) | Break Elongation (%) | Break Energy (N · M) |
|---|---|---|---|
| 30 mins at 120° C. | 4.70 | 31 | 0.23 |
| 30 mins at 150° C. | 6.59 | 29 | 0.29 |

Overlap Shear Strength

| Break Strength (30 mins at 150° C.) | ED-11 E-prime steel | 2.00 MPa |
|---|---|---|
| | Aluminum | 2.68 MPa |

TABLE 3a

DSC Analysis for Example 2

| Days at R.T. | $T_{onset}$ (°C.) | $T_{peak}$ (°C.) | Exotherm (J/g) |
|---|---|---|---|
| 7 (tacky) | 109.2 | 134.6 | 114.4 |
| 17 (low tack) | 103.1 | 139.7 | 67.3 |

TABLE 3b

Tensile and Overlap Shear Strength for Example 2

Tensile Strength

| Cure Conditions | Break Stress (MPa) | Break Elongation (%) | Break Energy (N · M) |
|---|---|---|---|
| 30 mins at 120° C. | 8.54 | 28 | 0.40 |
| 30 mins at 150° C. | 6.88 | 27 | 0.30 |

Overlap Shear Strength

| Break Strength (30 mins at 120° C.) | ED-11 E-prime steel | 0.95 MPa |
|---|---|---|

TABLE 4a

DSC Analysis for Example 3

| Days at R.T. | $T_{onset}$ (°C.) | $T_{peak}$ (°C.) | Exotherm (J/g) |
|---|---|---|---|
| 1 (tacky) | 157.2 | 182.9 | 79.8 |
| 5 (tacky) | 155.2 | 182.3 | 98.8 |
| 14 (tacky) | 155.3 | 181.7 | 100.4 |
| 21 (tacky) | 156.0 | 180.4 | 101.4 |
| 35 (tacky) | 155.1 | 181.7 | 89.4 |
| 46 (tacky) | 152.4 | 180.4 | 104.6 |
| 57 (tacky) | 150.6 | 161.6 | 100.9 |
| 68 (tacky) | 155.4 | 183.5 | 86.3 |
| 71 (tacky) | 159.1 | 182.9 | 82.4 |
| 78 (tacky) | 151.3 | 178.5 | 99.0 |

TABLE 4b

Overlap Shear Strength for Example 3
Cure Conditions: 12 mins at 175° C. followed by 30 mins at 120° C.

| Days at R.T. | Break Strength (MPa) |
|---|---|
| 8 | 5.31 |
| 15 | 5.43 |
| 28 | 5.60 |
| 46 | 5.67 |
| 57 | 5.21 |
| 68 | 5.74 |

TABLE 5a

DSC Analysis for Example 4

| Days at R.T. | $T_{onset}$ (°C.) | $T_{peak}$ (°C.) | Exotherm (J/g) |
| --- | --- | --- | --- |
| 1 (tacky) | 143.7 | 172.9 | 56.9 |
| 9 (tacky) | 130.1 | 168.5 | 69.2 |
| 14 (tacky) | 132.3 | 175.4 | 79.3 |
| 26 (tacky) | 146.1 | 177.9 | 68.8 |
| 50 (tacky) | 149.4 | 177.3 | 77.7 |
| 68 (tacky) | 149.0 | 175.5 | 74.4 |
| 77 (low tack) | 136.8 | 179.2 | 37.0 |
| 91 (low tack) | 157.9 | 179.1 | 35.8 |

TABLE 5b

Tensile and Overlap Shear Strength for Example 4

| | Tensile Strength | | |
| --- | --- | --- | --- |
| Cure Conditions | Break Stress (MPa) | Break Elongation (%) | Break Energy (N · M) |
| 30 mins at 120° C. | 6.98 | 51 | 0.63 |
| 30 mins at 150° C. | 6.44 | 34 | 0.53 |

| Overlap Shear Strength | | |
| --- | --- | --- |
| Break Strength (30 mins at 120° C.) | ED-11 E-prime steel | 1.23 MPa |

Various modifications and alterations of this invention will become apparent to those skilled in the art without departing from the scope and principles of this invention, and it should be understood that this invention is not to be unduly limited to the illustrative embodiments set forth hereinabove. All publications and patents are herein incorporated by reference to the same extent as if each individual publication or patent was specifically and individually indicated to be incorporated by reference.

We claim:

1. A stablized heat curable adhesive prepared from a formulation comprising:

(1) at least one free radically polymerizable monomer;

(2) at least one epoxy function monomer;

(3) at least one free radical polymerization photoinitiator;

(4) a thermally-initiated cationic catalyst system comprising:

(a) at least one salt of an organometallic cation, wherein the salt of the organometallic cation is selected from the class of substituted and unsubstituted aromatic compounds based on a benzene or cyclopentadienyl nucleus, the metal atom is a transition metal atom, and the anion is tetrafluoroborate, hexafluorophosphate, hexafluoroarsenate, or hexafluoroantimonate;

b) at least one stabilizing additive, wherein the stabilizing additive has a segment or central nucleus of a formula selected from the group consisting of

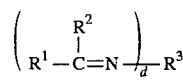
(1)

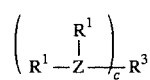
(2)

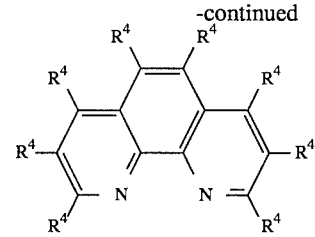
(3)

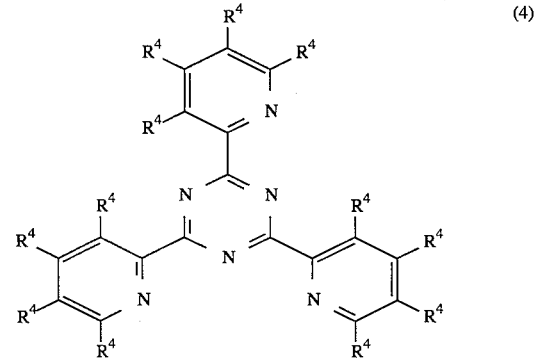
(4)

wherein $R^1$ is a radical moiety that can be the same or different and is selected from substituted and unsubstituted $C_1$ to $C_{10}$ alkyl groups, substituted and unsubstituted groups of one to four aromatic rings, wherein two to four rings can be fused or unfused rings;

$R^2$ is hydrogen or $R^1$ further when $R^2$ is $R^1$, $R^1$ and $R^2$ taken together can form a cyclic ring having 5 to 7 ring atoms;

$R^3$ is $R^1$ or divalent group (as when d=2) selected from alkylene, having 3 to 10 carbon atoms and phenylene groups;

$R^4$ is hydrogen, and each $R^3$ may be independently selected and is as defined above, and further two adjacent $R^3$ groups may be taken together to form a cyclic ring having 5 to 7 ring atoms;

Z is nitrogen, phosphorus, arsenic or antimony;

c is 1 or 2; and d is 1 or 2;

(5) optionally, at least on alcohol-containing material; and (6) optionally, adjuvants.

2. The stabilized heat curable adhesive according to claim 1 wherein the free radically polymerizable monomers are acrylate or methacrylate materials.

3. The stabilized heat curable ahdesive according to claim 1 wherein the salt of an organometallic cation has the formula:

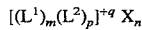

wherein:

M is selected from the group containing Cr, Mo, W, Mn, Re, Fe, Ru, and Os;

$L^1$ represents ligands contributing π-electrons that can be selected from substituted and unsubstituted aromatic compounds and substituted and unsubstituted heterocyclic aromatic compounds, and capable of contributing six π-electrons to the valence shell of M;

$L^2$ represents ligands contributing π-electrons that can be selected from substituted and unsubstituted cyclopentadienyl and indenyl anions, and capable of contributing six π-electrons to the valence shell of M;

m and p are integers having a value of 0 or 2, such that, when m is equal to 2, each $L^1$ may be the same or different ligands and p is equal to 0; and when p is equal to 2, each $L^2$ may be the same or different ligands and m is equal to 0, provided the sum of (m+p) is equal to 2;

q is an integer having a value of 1 or 2, the residual charge of the complex cation;

X is an anion selected from organic sulfonate anions selected from the group consisting of $CH_3SO_3^-$, $CF_3SO_3^-$, $C_6H_5SO_3^-$, p-toluenesulfonate, p-chlorobenzenesulfonate and related isomers, and halogen-containing complex anions of a metal or metalloid selected from the group consisting of $BF_4^-$, $AsF_6^-$, $PF_6^-$, $SbF_5OH^-$, $SbF_6^-$, $CF_3SO_3^-$; and n is an integer having a value of 1 or 2, the number of complex anions required to neutralize the charge q on the complex cation.

4. A stabilized heat curable adhesive comprising:
(1) at least one free radically polymerizable monomer selected from the group consisting of n-butyl acrylate, isobornyl acrylate, tetrahydrofurfuryl acrylate, and phenoxyethyl acrylate;
(2) at least one diglycidyl ether of bisphenol A monomers;
(3) 2,2-dimethoxy-2-phenylacetophenone;
(4) a thermally-initiated cationic catalyst system comprising:
 (a) either bis($\eta^5$-cyclopentadienyl)iron(1+) hexafluoroantimonate or bis($\eta^6$-mesitylene)iron(2+) hexafluoroantimonate; and
 (b) either 1,10-phenanthroline or

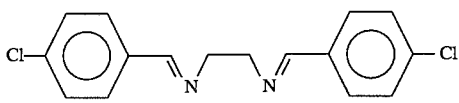

(5) optionally, at least one alcohol-containing material; and
(6) optionally, adjuvants.

* * * * *